United States Patent
Graziani et al.

[11] Patent Number: 6,160,509
[45] Date of Patent: Dec. 12, 2000

[54] METHOD AND APPARATUS FOR ALERTING A USER REGARDING THE POSITION OF A SATELLITE

[75] Inventors: Paul L. Graziani, Wayne; Douglas J. Claffey, Malvern, both of Pa.

[73] Assignee: Analytical Graphics, Inc., Malvern, Pa.

[21] Appl. No.: 09/116,773

[22] Filed: Jul. 16, 1998

[51] Int. Cl.[7] ............................. G01S 5/02; H04B 7/185; G01C 21/00; G06C 7/78

[52] U.S. Cl. ............................. 342/357.09; 342/357.13; 342/357.15; 701/213; 701/219; 701/226

[58] Field of Search .................. 342/357.09, 357.13, 342/357.15, 450, 357.1; 701/213, 219, 226; 455/427, 457

[56] References Cited

U.S. PATENT DOCUMENTS

| | | | |
|---|---|---|---|
| 5,043,736 | 8/1991 | Darnell | 342/357 |
| 5,309,351 | 5/1994 | McCain et al. | 364/132 |
| 5,382,962 | 1/1995 | Young | 345/167 |
| 5,389,934 | 2/1995 | Kass | 342/357 |
| 5,418,538 | 5/1995 | Lau | 342/357.15 |
| 5,469,175 | 11/1995 | Boman | 342/357 |
| 5,470,233 | 11/1995 | Fruchterman et al. | 434/112 |
| 5,528,248 | 6/1996 | Steiner et al. | 342/357 |
| 5,543,802 | 8/1996 | Villevieille et al. | 342/357 |
| 5,627,548 | 5/1997 | Woo et al. | 342/357 |
| 5,652,570 | 7/1997 | Lepkofker | 340/573 |
| 5,653,799 | 5/1997 | Dussell | 364/449.9 |
| 5,659,741 | 8/1997 | Eberhardt | 395/615 |
| 5,682,525 | 10/1997 | Bouve | 395/615 |
| 5,768,217 | 6/1998 | Sonoda et al. | 368/10 |
| 5,812,932 | 9/1998 | Wiedeman et al. | 455/13.1 |
| 5,852,401 | 12/1998 | Kita | 340/539 |
| 5,943,018 | 8/1999 | Miller | 343/702 |
| 5,963,181 | 10/1999 | Abe | 343/895 |
| 5,999,125 | 12/1999 | Kurby | 342/357.1 |

OTHER PUBLICATIONS

FED–STD–1037C, Telecommunications: Glossary of Telecommunication Terms, Federal Standard 1037C, p. C–28, Aug. 1996.

*Primary Examiner*—Thomas H. Tarcza
*Assistant Examiner*—Fred H. Mull
*Attorney, Agent, or Firm*—Roberts Abokhair & Mardula LLC

[57] ABSTRACT

An method and apparatus and method for determining the position of a satellite overhead by a user using portable computation equipment. The invention uses a portable computational equipment that can be as small as a digital wristwatch or portable computer. Data concerning satellite position is calculated using more robust calculation equipment such as PC and the like. The information on satellite location and timing is downloaded from the PC to the portable calculation equipment for later access in the field by the user. In an alternate embodiment, the orbital determinations can be downloaded to a remote unit for playback in the field.

20 Claims, 3 Drawing Sheets

METHOD AND APPARATUS FOR ALERTING A USER REGARDING THE POSITION OF A SATELLITE

FIELD OF THE INVENTION

The present invention relates generally to an apparatus and process for transferring data regarding satellite locations from a base unit with a large CPU to a remote, portable device with a smaller CPU. In particular, the present invention relates to an apparatus and process for informing a user of the locations of satellites by transferring satellite location data to a remote, portable computer, such as a PDA, portable PC, or other portable device with a CPU, a preprocessed data storage means, and a display, such as a watch with a CPU and an LCD.

BACKGROUND OF THE INVENTION

As technological advances continue at an ever increasing rate, the need for easier access to certain categories of data increases, including satellite navigational data and satellite location data for a business or an individual who needs to organize ground based activities that depend on data streams from a particular satellite. For a given location and time or range of time, specific information that may be needed in this context include which satellites are available or visible; which satellites provide optimal viewing azimuth, elevation and range; the ground swath for a given satellite; etc. The data from satellites also can be useful in ground truth operations, i.e., authentication of a ground position, or the use of a ground station that provides a reference point on Earth. Thus, transmission of data to, or receipt of data from, a particular satellite will be required for particular operations. Therefore, knowledge of the particular satellite's position for a given Earth location and time will facilitate the planning of operations dependent on that satellite. In addition, where any one of several satellites may be used for a given task, and one satellite is "overloaded", knowledge of alternate available satellites will facilitate completion of the operation. Similarly, where routing of signals between satellites is required for data transmission, alternate satellites may be used to provide bypass routes to compensate for an overloaded or malfunctioning satellite.

A variety of inventions have been developed that are portable, and -- due to their relatively small internal CPU's -- require periodic updating or other information transfer from a base unit with a larger CPU. Some of these inventions rely on satellite data to facilitate ground level operations. Other inventions have no satellite communication requirement, but do require updating of the limited data stored in a portable unit with modest internal memory. One such invention is that of U.S. Patent No. 5,682,525 to Bouve, et al., entitled "System And Methods For Remotely Accessing A Selected Group Of Items Of Interest From A Database", which discloses a means for remote access to positional/geographical, business, architectural, and other data. Satellite communications are utilized for navigational/location and other data. Optionally, advertisements for businesses in a selected area may be included in the output data stream.

U.S. Patent No. 5,659,741 to Eberhardt, entitled "Computer System And Method For Storing Medical Histories Using A Carrying Size Card",discloses a means to store a person's medical history on a credit card sized device, and access that information at a hospital, physician's office, ambulance, or other medical facility upon reading the information stored thereon. Thus, the comatose or unconscious patient's medical history can be accessed instantly, and thereby save time and possibly lives. The disclosed system and device can also be used for other purposes, for example, in monitoring the effects of a drug on a patient. By using the patient's credit card sized device, additional or updated information can be obtained and stored on the device by accessing the patient's file from a remotely located database.

U.S. Patent No. 5,652,570 to Lepkofker, entitled "Individual Location System", discloses a system for locating and continuously monitoring the location of a person, as well as medical or other information pertaining to that person. A wrist watch is worn by the person, and transmits information over radio frequency to the transponder of a pod unit that the person wears on a belt. - The pod unit transmits the received information to a central monitoring system. The central monitoring system can transmit alerts and inquiries to the pod unit, which in turn can transmit those alerts/inquiries to the wrist watch.

U.S. Patent No. 5,633,799 to Dussell, entitled "Combined PC/104 And Satellite Positioning System", discloses a portable apparatus for determining the location and time of observation of an individual. The apparatus can be a card or other portable device that conforms to the IEEE PC/104 Standard, and that includes a Satellite Positioning System (for example, GPS or GLONASS). An antenna to receive satellite signals (and frequency downconvert if necessary) is included, as are various microprocessors and buffers. The system is capable of performing calculations to determine position and time of observation, as well as formatting, display, signal processing, and other functions. An information transfer module is optionally included to permit information transfer to another electronic device.

U.S. Patent No. 5,627,548 to Woo, et al., entitled "Navigation Wristwear", discloses a wristwear device with a GPS receiver. A transparent microwave patch antenna is included, along with an LCD, and several elements on a single integrated circuit: a low-noise amplifier, a downconverter, a code processor, and a navigation processor. Two photovoltaic solar cells help maintain battery charge.

U.S. Patent No. 5,543,802 to Villevieille, et al., entitled "Position/Navigation Device And Method", discloses a means to help a person backtrack by providing the reverse of the forward route taken. The system operates by reference to n recorded waypoints, which have been generated from data from a GPS receiver.

U.S. Patent No. 5,528,248 to Steiner, et al., entitled "Personal Digital Location Assistant Including A Memory Cartridge, A GPS Smart Antenna And A Personal Computing Device", discloses a means for displaying a user's location as an icon on a map. The system includes a GPS Smart Antenna, a personal computing device with a display, a software operating system, and a map application program. An input select switch that is controlled by a Request To Send signal from the personal computing device enables the GPS Smart Antenna to use a single Universal Asynchronous/synchronous Receiver Transmitter (UART) chip for receiving a command/control signal from the personal computing device, and a differential GPS (DGPS) signal from a DGPS radiowave receiver.

U.S. Patent No. 5,470,233 to Fruchterman et al., entitled "System And Method For Tracking A Pedestrian", discloses a system with a software program that runs a satellite GPS designed specifically to aid blind and visually handicapped persons. The complete, preferred system comprises a GPS, a DGPS receiver, a notebook computer, a map and possibly other database(s), Sextant software, and an output system.

The output system may be a voice synthesizer and/or a Braille display. The system receives a first set of coordinates from the DGPS receiver, and correlates it with a second set of coordinates in the map database. A user also can customize the system by entering preferred location and feature data into a user-defined database, including appended GPS coordinates and exclusion areas where the user desires not to enter (for example, construction zones, bodies of water, high traffic congestion areas, etc.). The system directs the user where to go at each street intersection, and can alert the user when he/she is off course (and where to go to get back on course) or approaching an exclusion area. The system can be used without GPS input as an intelligent talking map.

U.S. Patent No. 5,469,175 to Boman, entitled "System And Method For Measuring Distance Between Two Objects On A Golf Course", discloses an electronic communication system and method for accurately measuring the distance between a golf ball and the hole or pin to which the golfer desires to hit the ball. Two GPS receivers are used -- one fixed (for example, at the clubhouse) and one mobile (positioned by the golf ball). Holes/pins previously have had their coordinates determined, as has the fixed GPS receiver. Accurately measuring, in effect, the coordinates of a golf ball on a green requires that the fixed and mobile GPS receivers simultaneously measure their current positions using satellite navigational signals. Variation in the position/coordinates of the fixed receiver from the known position/coordinates thereof permits the generation of a correction signal that compensates for noise and normal fluctuations/errors in the navigational signals. The correction signal then is transmitted from the fixed GPS receiver to the mobile GPS receiver to permit determination of the true position of the golf ball, and thereby compensate for noise and fluctuations/errors in the satellite navigational signals transmitted to the mobile GPS receiver. A simple mathematical calculation then derives the distance between the golf ball and the destination hole/pin to aid the golfer in selection of the best golf club for the next shot.

U.S. Patent No. 5,389,934 to Kass, entitled "Portable Locating System", discloses a tracking system comprising a GPS unit, a data storage unit, a clock, a microprocessor, cellular telephone equipment, and a means for converting digital data to voice. The tracking system is highly portable, and can be carried by a person or a vehicle.

U.S. Patent No. 5,309,351 to McCain, et al., entitled "Communications, Information, Maintenance Diagnostic And Training System", discloses a system with portable, self-contained components for providing detailed diagnostic, repair, and maintenance information for operating equipment of various types. Hand-held control devices may be used, and communication among system elements can be by infrared signals and/or hard wiring. A satellite using an infrared frequency for communications can be used to provide a means for exchange of data between a host computer, PC's, hand-held computing units, machinery, and process controllers.

U.S. Patent No. 5,043,736 to Damell et al., entitled "Cellular Position Locating System", discloses a system for determining the position of a remote unit that receives encoded navigational GPS transmissions via an "L" band antenna and receiver. The remote unit transmits encoded data via a cellular telephone modem and transmitter to a cellular telephone system. The data then are transmitted via the cellular telephone system over telephone lines to a base computer that can decode the data and provide appropriate display thereof in map form. The remote unit can be hand-held.

The U.S. patents discussed above provide examples of data transmission to remote portable units in a variety of environments and applications. What is needed is a remote portable system that will permit the user to know in real time which satellites are "visible" or available, and/or in optimal position for any set of coordinates describing the location of the user at a particular moment in time or any selected range of time. In addition, a system is needed that will permit the user to map out, in advance, the available or optimally positioned satellites for a particular path of a mobile user, for example, while on an airplane flight.

SUMMARY OF THE INVENTION

It therefore is an object of the present invention to provide an apparatus and process to supply a user with the location of a selected satellite in real time.

It is another object of the present invention to provide an apparatus and process to supply a user with a list of satellites available for the user's present location and application in real time.

It is a further object of the present invention to provide an apparatus and process to supply a user with a list of satellites available for a given time or time range and location in real time.

It is yet another object of the present invention to provide an apparatus and process to supply a user, in real time, with a list of satellites that are available and optimally positioned for a selected time period and for the user's desired location.

It is yet a further object of the present invention to provide an apparatus and process to supply a user, in real time, with a list of available and/or optimally positioned satellites for a mobile user on a specified path, for example, while on an airplane with a known flight path.

The present invention accomplishes the above objectives by first providing a base unit having a relatively large base CPU (large compared to that of a smaller portable unit), into which are loaded orbit determination logic software and satellite orbit parameters (with which the base CPU produces "satellite location data"), and a base communications means. The base communications means preferably utilizes a wireless communications link to a receiver of a portable remote unit. In addition to the receiver, the portable remote unit has a user input parameters device, a remote pre-processed data storage unit, a relatively small remote CPU, and an output/display unit. The receiver accepts satellite location data from the base unit, and then transmits the data to the remote pre-processed data storage unit. When a user activates the remote unit, the remote CPU requests the satellite location data from the remote pre-processed data storage unit. Upon receipt of the satellite location data from the remote pre-processed data storage unit, the remote CPU processes the data to provide the desired output satellite location data, which are transmitted to the output/display unit. Communication between the base unit and the remote unit is accomplished by an electromagnetic (for example, RF, visible light, ultraviolet light, microwaves, or IR) or other wireless means; alternatively, a direct connection means (i.e., hard wiring) can be used, for example, fiber optics, telephone lines, or directly linked cable. User input data control the amount, format and content of the satellite location output data, which are displayed on the remote output/display. The satellite location output data can include such data as satellite location in real time, or satellite location at a selected time and user position (i.e., data such as viewing azimuth, elevation and range data for access to a satellite), available and/or optimally positioned satellites for a given user location and time or range of time, available and/or optimally positioned satellites for a given path of a mobile user, for example, on an airplane with a known flight path, the ground swath for a given satellite, and satellite access intervals.

Satellite location data can be used to optimize transmission or reception of data, including navigational data. Thus, a user may need to know his exact position on Earth, and may select the optimal three satellites for precise position determination, or two optimally positioned satellites and a ground station may be used. Alternatively, a user may require access to a data base communicated by a particular satellite. In each of these situations, knowledge of the locations of satellites is critical to the optimum transmission and reception of data. The present invention accomplishes the above objectives by providing a highly portable unit that can be used remotely to determine the position of one or more satellites for given time-place parameters. In addition, the highly portable unit may have its satellite location data updated either by direct link or by wireless transmission when required. For real time updating of data in the remote pre-processed data storage unit, the user activates the receiver, and communication with the base unit is established for transfer of data by the desired wireless or direct means.

DESCRIPTION OF THE PREFERRED EMBODIMENTS

Figure 1:
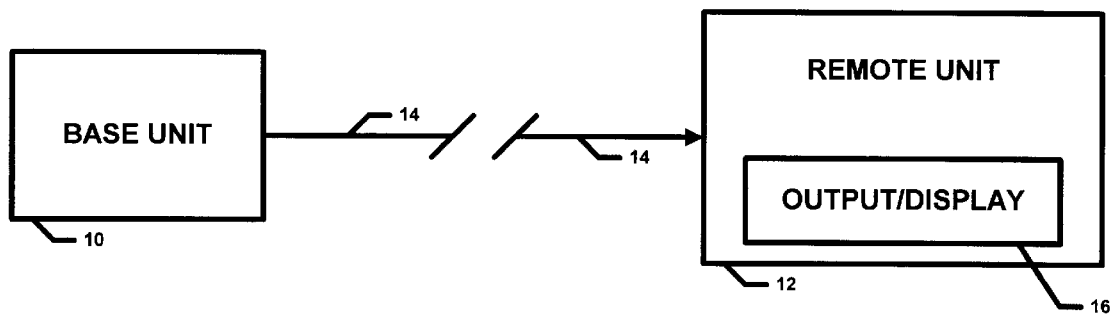
FIG. 1 shows the basic components of the satellite alert system of the present invention.

Referring to FIG. 1, the configuration of the major components of the present invention is shown. Base unit 10 is connected by communications link 14 to remote unit 12. Communications link 14 may be wireless or direct connection. In a wireless link, an electromagnetic radiation means is used, such as a UV, visible, IR, RF, or microwave means --preferably RF or IR. In a direct link (i.e., hard wired), fiber optics, telephone lines, or directly linked cable can be used. Output/display 16 provides the output means for the remote unit, and can be a liquid crystal display (LCD), an electroluminescent (EL) device, or a cathode ray tube (CRT), to provide nonlimiting examples. Remote unit 12 can be a remote, portable computer, such as a Personal Display Assistant (PDA), a portable PC, or other portable device with a CPU, a pre-processed data storage means, and a display, such as a watch.

Figure 2:
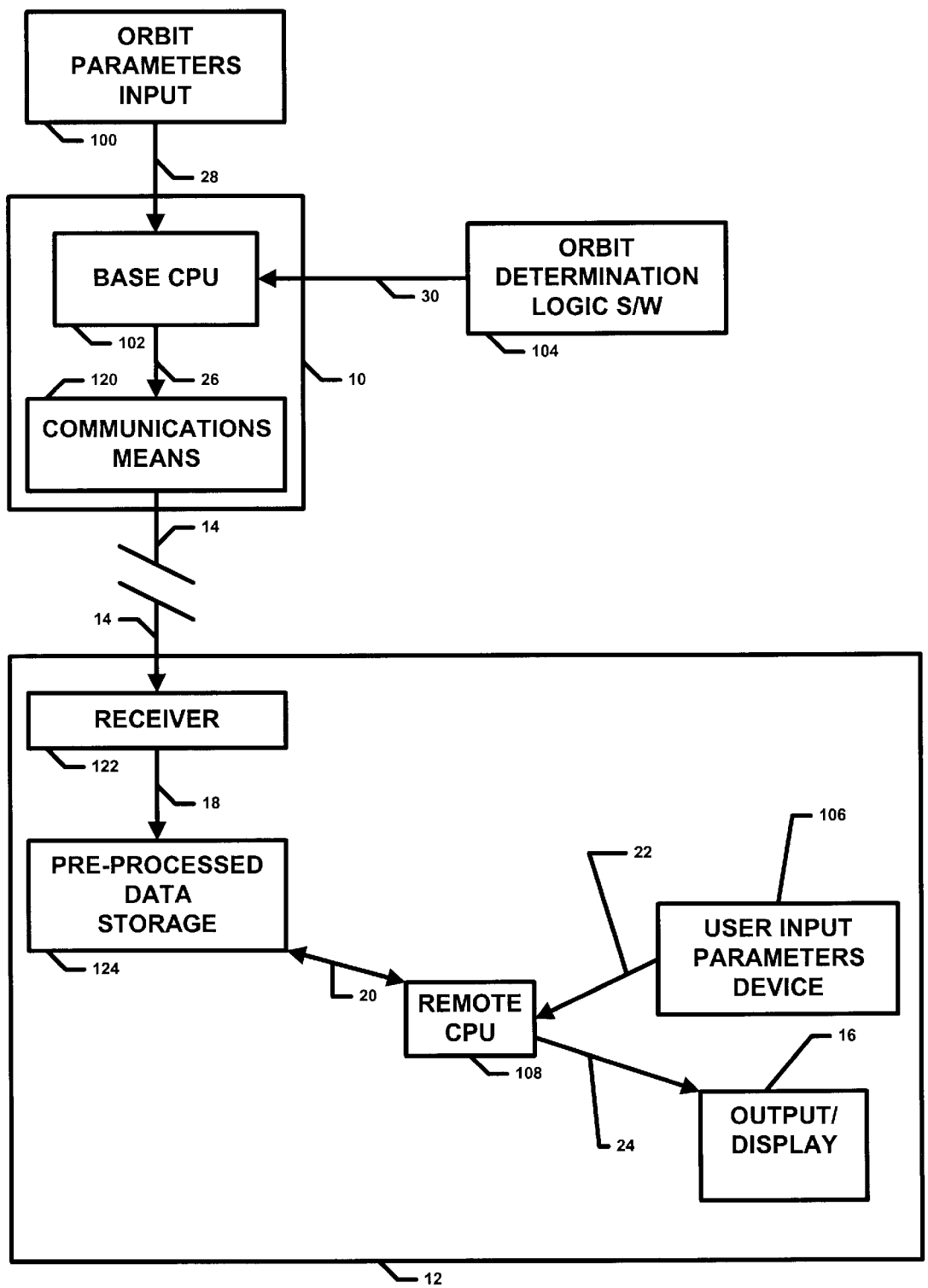
FIG. 2 shows, broadly, the input, output, software, hardware, communications links, and other communications components of the present invention.

Referring to FIG. 2, base unit 10 and remote unit 12 are shown again in greater detail. Focusing on the base unit, orbit parameters input 100 is shown with communications link 28 to base CPU 102. Thus, orbit parameters of the satellites of interest are supplied to the base CPU by communications link 28. Orbit determination logic software 104, for directing the processing of the satellite orbit parameters 100, is supplied to the base CPU via communications link 30. When called upon to transmit the processed satellite orbital data ("satellite location data", which are "pre-processed" relative to the output of the ultimate user: the remote unit), the base CPU transmits the data to base communications means 120 via communications link 26. Base communications means 120 can be a modem, a laser, an RF transmitter, or any other transmission/communication means that can transmit data from the base unit to the remote receiver via communications link 14.

Remote receiver 122 is the matching receiver for base communications means 120. Thus, the remote receiver can be a modem, an RF receiver, or any other receiver appropriate for receiving data transmitted by a particular base communications means. Upon receipt of preprocessed satellite location data from the base unit, the remote receiver transmits the data to preprocessed data storage unit 124 via communications link 18. Pre-processed data storage unit 124 holds the pre-processed data until they are needed by remote CPU 108, at which time they are transmitted to the remote CPU via communications link 20.

User input parameters device 106 permits the user to specify the desired output data to remote CPU 108 via communications link 22, where the input parameters are stored until output. Upon receipt of the input parameters, the remote CPU accesses the most recent satellite location data in the pre-processed data storage unit 124 via communications link 20, and processes the data for transmission to output/display unit 16 via communications link 24. Communications links 18, 20, 22, 24, 26, 28, and 30 typically will be direct connection links (i.e., hard wired) in the preferred embodiment, though wireless links can be implemented in alternate embodiments.

Figure 3:
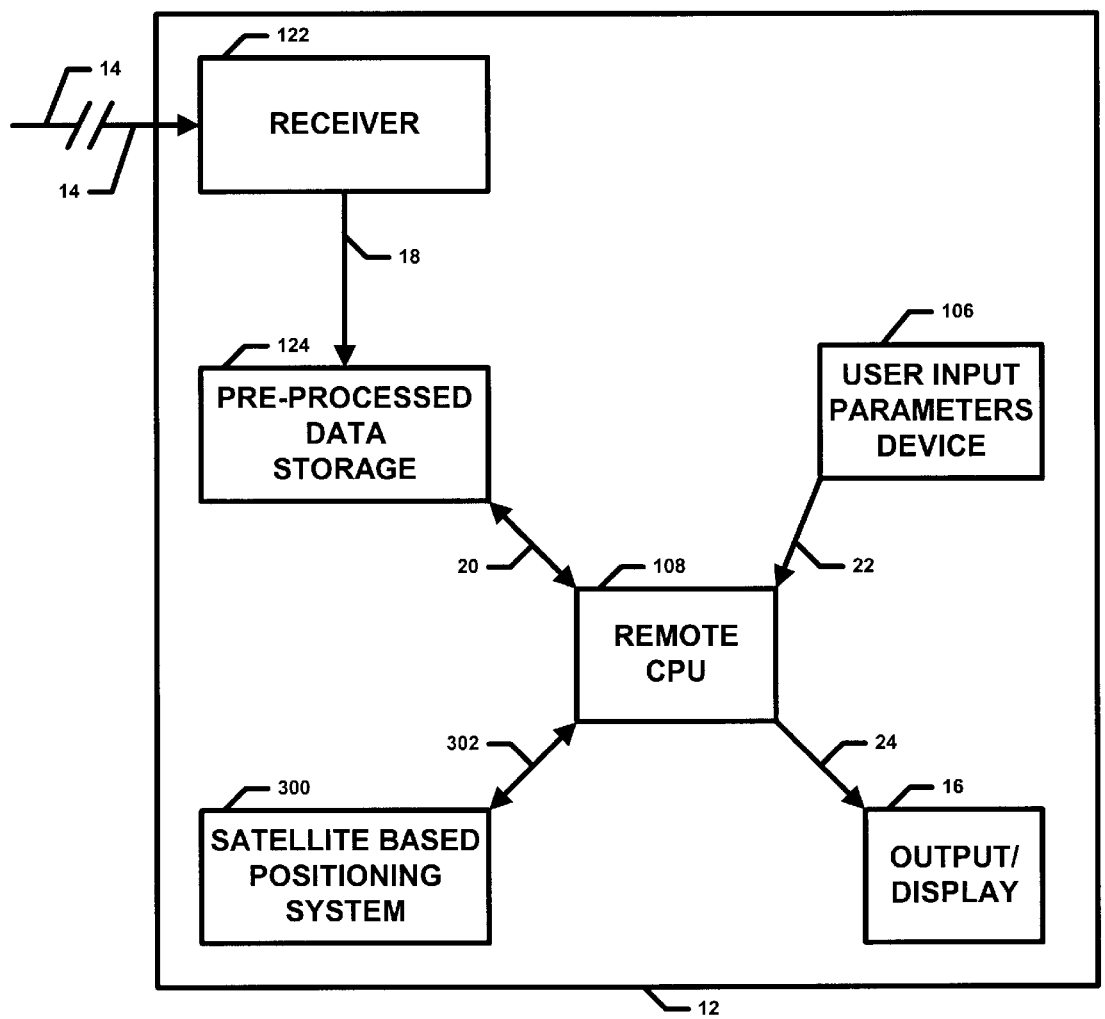
FIG. 3 shows an embodiment of the remote unit of the present invention in which a satellite based positioning system is used.

Referring to FIG. 3, an embodiment is shown with a satellite based positioning system 300 (SBPS) that communicates with the remote CPU via communications link 302. Thus, the user who requires real time knowledge of his position, prior to requesting location data on a given satellite (s), can simply activate the SBPS, which then transmits the resulting location data to the remote CPU via communications link 302. The user activates the SBPS via user input parameters device 106, which results in a request being transmitted to the remote CPU via communications link 22, and thence to SBPS 300 via communications link 302. Communications link 302 preferably will be a direct connection, but wireless connections can be implemented in alternate embodiments. SBPS 300 can operate via any one or more of the commonly used systems, such as Global Positioning System (GPS), LORAN-C, Omega, TACAN, Decca, Joint Tactical Information Distribution System (JTIDS), Position Location and Reporting System (PLRS), or Global Orbiting Navigational System (GLONASS).

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, but are not expressly stated herein. These modifications, alterations and improvements are intended to be suggested hereby, and within the spirit and scope of the invention. Accordingly, the invention is limited only by the following claims and equivalents thereto.

We claim

1. An apparatus for providing satellite location data, comprising: a base unit with a base CPU, means for inputting satellite orbital parameters, logic for pre-processing satellite orbital parameters to produce pre-processed satellite location data, and a base communications means for transmitting pre-processed satellite location data; and a remote unit with a remote receiver for receiving pre-processed satellite location data, a remote preprocessed data storage unit for storing pre-processed satellite location data, a remote CPU for processing the pre-processed satellite location data to produce processed satellite location data, and logic and a device for displaying the processed satellite location data.

2. The apparatus for providing satellite location data according to claim 1, wherein: the means for inputting satellite orbital parameters is connected by a first communications link to the base CPU;

the logic for pre-processing satellite orbital parameters is connected by a second communications link to the base CPU;

the base CPU is connected by a third communications link to the base communications means;

the base communications means is connected by a fourth communications link to the remote receiver;

the remote receiver is connected by a fifth communications link to the remote preprocessed data storage unit;

the remote pre-processed data storage unit is connected by a sixth communications link to the remote CPU; and the remote CPU is connected by a seventh communications link to the processed satellite location display device.

3. The apparatus for providing satellite location data according to claim 2, where the fourth communications link is wireless.

4. The apparatus for providing satellite location data according to claim 3, where the wireless fourth communications link is accomplished by electromagnetic radiation.

5. The apparatus for providing satellite location data according to claim 4, where the electromagnetic radiation is selected from the group consisting of infrared light, radio frequency, visible light, ultraviolet light, and microwaves.

6. The apparatus for providing satellite location data according to claim 2, where the fourth communications link is accomplished by direct connection.

7. The apparatus for providing satellite location data according to claim 6, where the direct connection is selected from the group consisting of fiber optics, telephone line, and cable.

8. The apparatus for providing satellite location data according to claim 1, where the processed satellite location data display device is selected from the group consisting of liquid crystal display (LCD), electroluminescent device (EL), and cathode ray tube (CRT).

9. The apparatus for providing satellite location data according to claim 1, further comprising a satellite based positioning system.

10. The apparatus for providing satellite location data according to claim 9, where the satellite based positioning system is selected from the group consisting of GPS, GLONASS, PLRS, JTIDS, Decca, TACAN, and Omega.

11. The apparatus for providing satellite location data according to claim 9, where the satellite based positioning system is connected by an eighth communications link to the remote CPU.

12. The apparatus for providing satellite location data according to claim 11, where the eighth communications link is accomplished by direct connection.

13. The apparatus for providing satellite location data according to claim 12, where the direct connection is selected from the group consisting of fiber optics, telephone line, and cable.

14. The apparatus for providing satellite location data according to claim 11, where the eighth communications link is accomplished by electromagnetic radiation.

15. The apparatus for providing satellite location data according to claim 14, where the electromagnetic radiation is selected from the group consisting of infrared light, radio frequency, visible light, ultraviolet light, and microwaves.

16. A method for providing satellite location comprising:

inputting orbital parameters to a CPU, the CPU comprising logic for pre20 processing satellite orbital parameters to produce pre-processed satellite location data;

transmitting the pre-processed satellite location data to a remote unit;

receiving the pre-processed satellite location data at the remote unit;

storing the pre-processed satellite location data at the remote unit;

processing the pre-processed satellite location data to produce processed satellite location data; and displaying the processed satellite location data at the remote unit.

17. The method for providing satellite location of claim 16 wherein the transmitting further of the pre-processed satellite data comprises transmitting in a wireless mode to the remote unit.

18. The apparatus for providing satellite location data according to claim I wherein the remote unit is taken from the group consisting of portable computers, palmtop computers, personal digital assistants (PDA's), and wristwatches.

19. A system for providing satellite location data, comprising:

a base unit with a base CPU, means for inputting satellite orbital parameters, logic for pre-processing satellite orbital parameters to produce pre-processed satellite location data, and a base communications means for transmitting pre-processed satellite location data; and a wristwatch comprising a remote unit with a remote receiver for receiving preprocessed satellite location data, a remote pre-processed data storage unit for storing preprocessed satellite location data, a remote CPU for processing the pre-processed satellite location data to produce processed satellite location data, and logic and an LCD for displaying the processed satellite location data.

20. A method for providing satellite location comprising:

inputting orbital parameters to a CPU, the CPU comprising logic for preprocessing satellite orbital parameters to produce pre-processed satellite location data;

transmitting the pre-processed satellite location data to a remote wristwatch;

receiving the pre-processed satellite location data at the remote wristwatch;

storing the pre-processed satellite location data at the remote wristwatch;

processing the pre-processed satellite location data to produce processed satellite location data; and displaying the processed satellite location data on an LCD on the remote wristwatch.

* * * * *